United States Patent [19]

Myler et al.

[11] 3,744,475
[45] July 10, 1973

[54] TILTING BRAZIER

[75] Inventors: George W. Myler; Edward A. Reid, Jr., both of Columbus; Robert G. Venendaal, Arlington, all of Ohio

[73] Assignee: Columbia Gas System Service Corporation, Wilmington, Del.

[22] Filed: Apr. 13, 1972

[21] Appl. No.: 243,577

[52] U.S. Cl. .............................. 126/39 R, 99/407
[51] Int. Cl. .................................... F24c 3/00
[58] Field of Search ............... 126/39, 211; 99/407

[56] References Cited
UNITED STATES PATENTS
2,176,701  10/1939  Brumelle............................ 99/407
FOREIGN PATENTS OR APPLICATIONS
481,164   2/1952  Canada............................... 99/407

*Primary Examiner*—Edward G. Favors
*Attorney*—Harold L. Stults

[57] ABSTRACT

A tilting brazier including a flat cooking pan having upper and lower surfaces, has a plurality of heat pipes mechanically and thermally bonded to the lower surface of the pan in heat transfer relation therewith. The heat pipes have evaporator and condenser portions with substantially the entire condenser portion of each of the pipes being located beneath the pan while the evaporator portions thereof extend beyond the periphery of the pan. A gas fired burner positioned adjacent the evaporator portions of the heat pipes supply heat thereto so that heat supplied to the evaporator portions thereof is uniformly transmitted to the pan through the condenser portions of the heat pipes.

21 Claims, 5 Drawing Figures

TILTING BRAZIER

The present invention relates to a commercial or institutional cooking device and in particular to a flat bottomed cooking pan to which heat is supplied at a uniform rate to prevent burning of food in the pan during the cooking operation.

In previously proposed commercial cooking appliances, for use in large kitchens where food is prepared in substantial quantities, such as are used for example, in hotels, restaurants, schools and the like, a substantial problem exists since the bottom of the cooking pan normally has non-uniform temperatures because of the location and arrangement of the heat supply with respect to the pan. Typically, the pan is pivotally mounted so that the food contents therein can be readily poured from the pan and therefore the heat supply, normally a gas burner or the like, can only be located near one end of the pan. As a result, most of the heat is supplied and conduction through the pan bottom to the remainder of the pan's cooking surface. Accordingly, certain portions of the pan will be hotter than other portions, thereby creating hot spots in the pan which will degrade or burn the food at those portions of the pan.

Several attempts have been made in the past to overcome this problem, however, none have been entirely satisfactory. Specifically, it has been suggested that the base of the cooking pan be made relatively thick, so that conduction of the heat through the plate will equilibrate the temperatures throughout the plate even though the heat input is on one portion thereof. This solution has not been entirely satisfactory since the thick plate is of coures relatively expensive and it takes a substantial amount of time and heat to raise the temperature of the plate to a uniform level at which cooking can take place. Further, there is a substantial lag in the time in which an increase in heat input from the burner will actually be transferred to the product. Therefore, such plates are not readily responsive to changes in temperature settings and food loads placed in the pan.

To avoid these problems, it also has been suggested, as for example in U.S. Pat. No. 3,489,133, to provide the base of the pan with a plurality of heat exchanger fins extending therefrom in order to improve the transfer of heat from the products of combustion of a gas burner. However, such systems also tend to produce hot spots in the base of the pan at the location of the heat fins and therefore also are not totally satisfactory in use.

Another problem with previously proposed commercial cooking appliances of the above described type is that in most cases the cooking pan is mounted for pivotal or tilting motion so that the products in the pan can be emptied therefrom. However, the pivotal mounting is normally located at or below the center of gravity of the pan so that a substantial angle of tilt must be created before the entire contents of the pan can be emptied therefrom. In addition, the tilting apparatus is usually a manually operated crank device so that the tilting operation is not performed with a uniform speed. As a result, the contents of the pan will often tend to flow rapidly from the pan because of the excessive or even varying speeds of tilting motion which occur with manually operated devices. Often, when the food moves from the pan too rapidly, the tilting motion must be reversed to reduce the flow of food in the pan. Since the reaction time of the operator places a delay period in this reversing action, spillage from the pan during this delay cannot be avoided. Moreover, the momentum of the pan will often carry the pan beyond the desired stopping point, again causing spillage of the food products.

In addition, most conventional cooking appliances of this type are pivotally mounted adjacent their centerline or center of gravity to permit emptying of the cooking pan or vessel. The problem with that type of arrangement is that the pouring spout will then move about twelve or more inches horizontally with respect to the floor as it is pivoted from its normal cooking position to its extreme emptying position. Moreover, the spout will move closer to the floor as it tilts and with large cooking vessels may move downwardly twelve inches or more to reach its fully tilted emptying position. As a result of this excessive spout movement it is often necessary to move the serving or receiving vessel into which the contents are poured and the size of the receiving vessel which can be used is restricted because of the downward movement of the spout.

Accordingly, it is an object of the present invention to uniformly heat the bottom surface of a cooking pan in commercial and institutional cooking appliances.

Another object of the present invention is to provide a cooking appliance having a pivotally mounted cooking pan which can be readily tilted to empty the contents of the pan at a relatively small angle.

Another object of the present invention is to provide a relatively large cooking appliance in which the discharge spout moves only a relatively small distance in both the horizontal and vertical directions between its normal cooking position and its fully tilted emptying position.

Yet another object of the present invention is to provide a commercial cooking appliance which is relatively inexpensive in construction and which is both economical and durable in use.

In accordance with an aspect of the present invention a commercial cooking appliance, such as a tilting brazier, is provided having a cooking pan which includes a relatively flat bottom and a plurality of side walls extending upwardly therefrom. The pan is generally rectangular in construction, when viewed in plan, and has front, rear and side walls, and means pivotally mounting the pan on a supporting stand adjacent the juncture between its front wall and its bottom. A plurality of heat pipes are secured to the lower surface of the cooking pan in heat transfer relation therewith.

The heat pipes have evaporator and condenser portions, with substantially the entire condenser portion of each of the pipes being located beneath the pan and the evaporator portions thereof extending beyond the rear wall. A gas fired burner is mounted in the supporting stand in order to supply heat to the evaporator portions of the heat pipes. The heat thus supplied to the evaporators is uniformly transmitted from the evaporators to the pan through the condenser portions of the heat pipes.

By this arrangement the cooking surface of the pan is supplied with uniform heat at a controlled rate and the creation of hot spots thereon is avoided. As a result, the bottom surface of the pan can be made relatively thin. In addition, the pivotal mounting of the pan at the juncture between the front wall and the bottom of the pan permits the pan to be emptied with a relatively small angle of tilt.

To enhance emptying of the pan, the front wall thereof is provided with a spout extending angularly outwardly from the pan at an angle of approximately 45° and is located adjacent one end of the front wall of the pan so as to be in a convenient position for the operator to capture the contents of the pan in a bucket or auxiliary pot as desired. Moreover, because the pivotal mounting of the pan is at the front edge thereof, the spout will move only a relatively small distance in the horizontal or vertical directions between its normal cooking position and its fully tilted position. Accordingly, the receiving vessel can remain stationary during the entire pouring operation and relatively large receiving vessels, such as thirty or forth gallon stock pots or serving pans mounted on carts, can be used to receive the contents of the cooking applicance. Since the spout moves downwardly only a relatively small distance, more room remains between the spout and the floor to accommodate these large vessels.

The above, and other objects, features and advantages of this invention will become apparent in the following detailed description of an illustrative embodiment thereof which is to be read in connection with the accompanying drawings, wherein.

Figure 1:
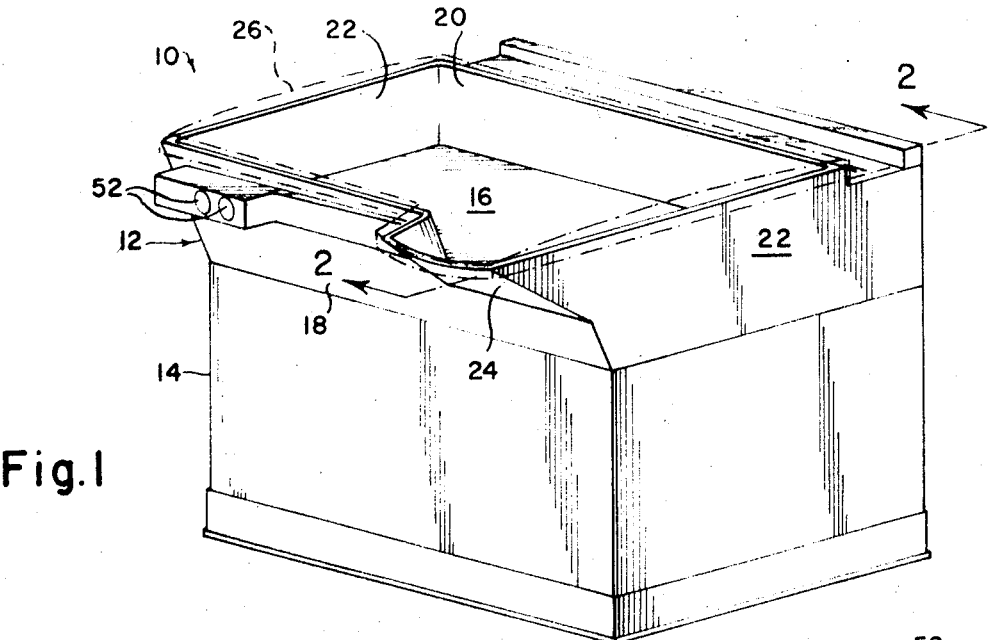
FIG. 1 is a perspective view of a tilting brazier constructed in accordance with the present invention, with a cover therefore illustrated in phantom lines.

Referring to the drawings in detail, and initially to FIG. 1 thereof, it will be seen that a tilting brazier 10, constructed in accordance with the present invention, includes a cooking pan 12 mounted on a supporting stand 14. Pan 12 is of a relatively large size for use in cooking large quantities of food such as are required in hotels, hospitals, restaurants, schools and similar types of institutions and is generally rectangular in plan, having bottom wall 16 formed integrally with front and rear walls 18, 20 and a pair of side walls 22.

Front wall 18 extends outwardly from the bottom wall 16 an an angle of approximately 15° (FIG. 2), and has a spout 24 formed adjacent one end thereof and extending outwardly from bottom wall 16 at an angle of approximately 45° for reasons more fully described hereinafter. Spout 24 includes a flat wall section 25 and a curved wall section 27 which tangentially interconnects spout wall 25 to pan bottom 16.

Figure 3:
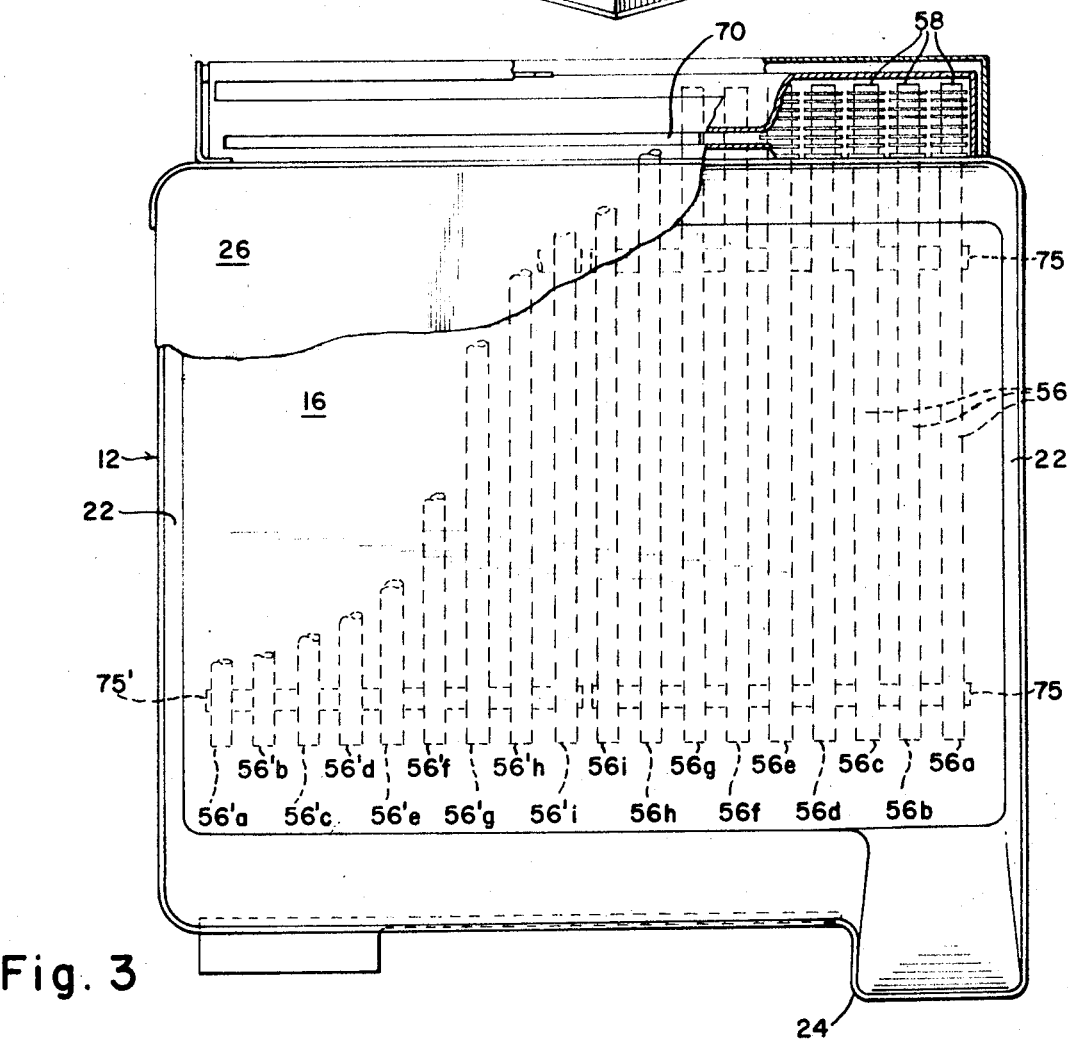
FIG. 3 is a plan view of the appliance illustrated in FIG. 1, with parts broken away for clarity.
Figure 2:
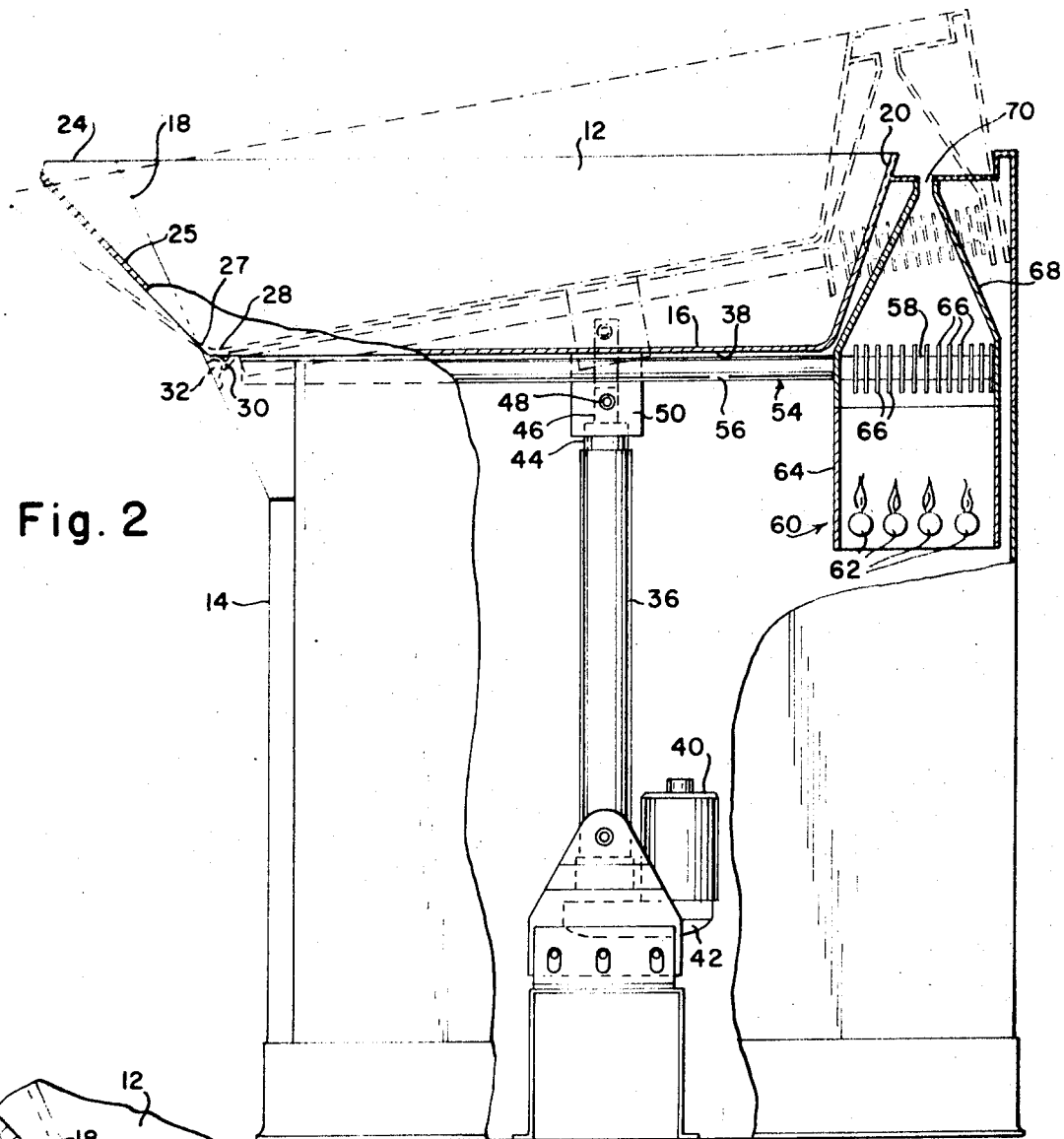
FIG. 2 is an elevational view taken along line 2—2 of FIG. 1, showing the appliance of the present invention with parts broken away and partly in section, and illustrating the cooking and emptying positions of the cooking pan.
Figure 4:
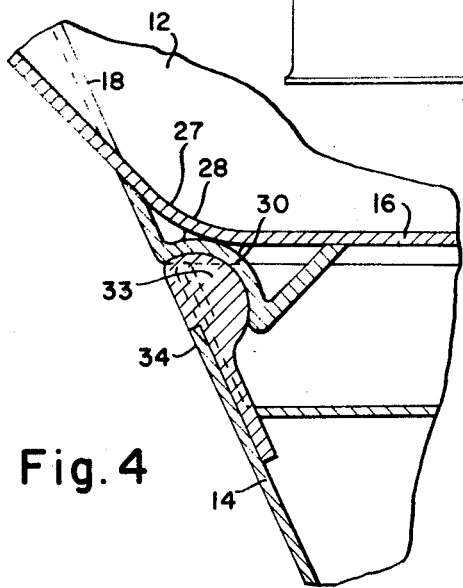
FIG. 4 is an enlarged partial sectional view of the pivotal mounting of the cooking pan on the supporting stand.

Rear wall 20 and side walls 22 of pan extend vertically therefrom, or preferably, as seen in FIGS. 2 and 3, at a slight angle from base 16. In either case, the entire pan is covered by a top 26, which conforms in plan to the peripheral configuration of the pan and is illustrated in FIG. 1 in phantom lines. Preferably the top is completely removable from the pan and simply rests on the top edges of the pan walls to cover the pan and food therein during cooking.

Pan 12 is pivotally mounted on stand 14 along its front edge at juncture 28 between front wall 18 and bottom wall 16. At this point the pan is provided with a curved supporting surface 30 integrally connected therewith and extending along the entire front edge of the pan. Curved surface 30 receives a complementary curved surface 32 formed by an elongated curved member 33 secured to the front edge 34 of stand 14. curved surface 30 is simply seated on curved surface 32 so that pivotal motion of pan 12 with respect to stand 14 is permitted. Alternatively, member 33 may be formed in two or more separate sections for convenience in manufacturing.

The remaining supporting structure for pan 12 includes a screw jack 36 which is pivotally connected to the lower surface 38 of the pan bottom 16. Jack 36 is of conventional construction, as would be apparent to those skilled in the art, and is operated by a motor 40 through a transmission 42, which serves to rotate the actuator rod 44 of the jack. The free end 46 of the jack is pivotally connected at 48 to a mounting bracket 50 secured to the bottom 38 of the pan. In this manner, the pan is supported at two points, i.e. at pivot point 48 and at the interface between surfaces 30 and 32 so that the pan is supported at all times in a stable configuration. Motor 40 is selectively operable to raise and lower actuator rod 44 and thereby tilt or pivot pan 12 about the surface 32.

By having the pivotal mounting point of the pan at the bottom front edge thereof, an improved pouring pattern for the food contents in the pan is provided. That is, the pan need only be tilted through a small angle in order for the contents thereof to be poured from spout 24. In this regard, it has been found that a tilt angle of approximately 15° approximately 75 percent of the contents of a full pan will be discharged from the cooking pan through spout 24. To fully empty the pan it need only be tilted to an angle of 45°, at which point the 45° spout 24 is in a relatively horizontal position so that the entire contents of the pan will flow therefrom. Moreover, the 45° tilt provides a good presentation of the contents of the pan to the operator for scraping the food therefrom.

It is noted that in the prior art substantially all of the commercial cooking appliances require tilting of the cooking pan through an angle of approximatley 90° for the entire contents of the pan to be emptied therefrom. Accordingly, the construction of the present invention represents a substantial improvement over the prior art since the 45° tilt not only provides good presentation for scraping the food from the pan, particularly where thick stews and sauces are being cooked, but also permits a more controlled flow of the food products in the pan from the spout.

In addition, because of the location of the pivotal connection between pan 12 and stand 14 at the forward edge of the pan, the free edge 25 of spout 24 will have virtually no horizontal movement as the pan is tilted during the pouring operation and, as seen in FIG. 2, will move only a relatively small distance downwardly. As a result of the lack of horizontal movement of spout edge 25 during tilting, the contents of the pan are always poured onto essentially the same spot and a receiving or serving vessel can be placed on the floor, or a stand, under spout 24 for filling, without the necessity of moving the vessel as the cooking pan is tilted to empty its contents. Moreover, because of the relatively small vertical movement of spout edge 24, as a result of the pivotal mounting of the pan and the configuration of the spout, a relatively large amount of room remains free below the spout so that relatively large receiving vessels, such as 30 or 40 gallon stock pots or vessels mounted on serving carts can be used to receive the contents of the pan. These of course, represent substantial improvements in the use and operation of the cooking appliance as compared to those of the prior art.

In addition, because of the location of spout 24 at the side of front wall 18, the contents of the pan will flow from the pan at a convenient location for them to be handled by the operator. By locating spout 24 adjacent the side of the apparatus, an operator can stand in front of the cooking pan to conveniently and closely observe the cooking process. Moreover, the controls for motor 40, which can be simply a series of buttons or a toggle switch 52, mounted on the front wall of the pan, are readily accessible to an operator standing in front of the pan to permit rapid control of the tilting operation in response to the pouring pattern or conditions he is observing. This again is a substantial improvement over the prior art wherein, for example, as shown in the above-mentioned patent, the spout is normally located in the center of the pan and the controls at the side so that it is difficult for the operator to observe the pan and the receiving vessel from the front while simultaneously controlling the tilting motion of the pan.

Figure 5:
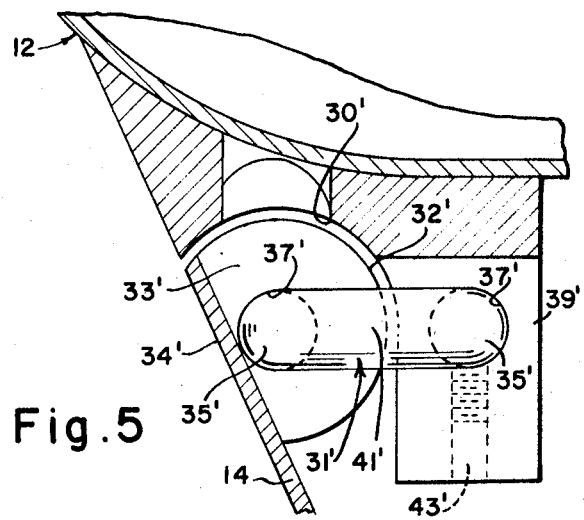
FIG. 5 is a view, similar to FIG. 4, of another embodiment of the pivotal mounting of the cooking pan.

Another embodiment of the pivot structure adapted for use in the pan of the present invention is illustrated in FIG. 5. As seen therein, a curved supporting structure or surface 30' is integrally connected to and extends across the entire front edge of pan 12 below the cooking surface. Curved member 30' receives the curved complementary surface 32' formed by the elongated member 33' secured to the front edge 34 of stand 14. A generally U-shaped pin 31' operatively interconnects members 30' and 33' with its legs 35' being respectively received in openings or bores 37' formed in an extension 39' of members 30' and in member 33'. The bight portion 41' of pin 31' extends between legs 35' and the pin is rigidly secured in extension 39' by a set screw 43'. By this arrangement the bight portion 41' is located on a radius of pivotal mounting of the pan so that the pan can pivot about member 33', yet cannot be lifted off of stand 14 at its front edge.

In accordance with a further feature of the present invention, heat is supplied to the bottom 16 of pan 12 in a uniform distribution through a novel heat transfer system. This is accomplished by the provision of a plurality of heat transfer devices 54 conventionally termed "heat pipes" in the heat transfer art. These pipes are generally elongated closed cylindrical members containing a heat transfer fluid therein.

In accordance with one embodiment of the present invention, the heat pipes are approximately 1 inch in diameter and each have a condenser section 56 which is approximately 22 inches long and an evaporator section 58 which is approximately 6 inches long. Typically 17 to 20 heat pipes are secured to the bottom 38 of pan 12 with substantially the entire length of the condenser sections 56 bonded to the lower surface 38 of pan 16 by brazing, which provides a good mechanical and thermal bond between the pan and the heat pipes.

The heat pipes utilized in the present invention operate in a well known manner, such that heat supplied to the evaporator sections 58 thereof cause the fluid in the evaporator sections to vaporize and move to the condenser or heat output sections 56 of the pipes. In this section, the vapor condenses and gives off its heat of vaporization so that the vapor returns to its liquid state and the heat of vaporization is transferred to the bottom of the pan. The vaporized liquid then moves back to evaporators 58 through a wick in the condenser under capillary action. This movement takes place because the wick at the evaporator end of the heat pipe is relatively dry as a result of the vaporization of the liquid therein under the influence of heat applied to the evaporator.

In a presently preferred embodiment of the invention, heat is supplied to evaporators 58 by a conventional gas blue flame burner system 60 mounted in stand 14. Gas burner system 60 includes a plurality of blue flame atmospheric burners 62 which extend across the width of the pan, beneath the evaporators 58 and are shielded by a duct or flue 64 which directs the products of combustion produced by the burners upwardly and around the evaporator sections 58 of the heat pipes. Evaporators 58 have a plurality of heat transfer fins 66 secured thereto to improve the transfer of heat from the products of combustion to the fluid in the heat pipe.

An exhaust flue or duct 68 is integrally secured to the rear wall 20 of pan 16 and encloses the evaporator ends 58 of the heat pipes so as to retain the products of combustion in intimate contact therewith. The upper end of the flue 68 has an elongated opening 70 formed therein through which the products of combustion are exhausted by convection after passing evaporator sections 58. By this construction the heat pipes move with pan 12 when it is tilted to empty the food products therein. Of course, flue 68 which is secured to pan 12, also moves therewith, as illustrated in dotted lines in FIG. 2.

The heat produced by burners 62 is uniformly transmitted from evaporator sections 58 of the heat pipes through the condenser sections 56 thereof to the bottom of pan 16. Since the heat pipes are closely spaced on the bottom of the pan (e.g. 1.8 inches on center for 1 inch diameter heat pipes) the heat is uniformly transmitted to the pan and the creation of not spots and localized burning of the food being prepared is avoided As a result of this uniform distribution of heat, a lighter gauge metal bottom can be used in the pan and therefore the pan will store less heat. Accordingly, the pan will be more responsive to changes in the temperature setting or the food loading in the pan so that overcooking and burning of the food, as often occurs with previously proposed industrial cooking appliances, is avoided.

In addition, the transfer of heat from the products of combustion to the pan is more efficient with the use of heat pipes than with previously proposed arrangements wherein the products of combustion merely are directed past the bottom of the pan. Further, because the gas burner and products of combustion are located at the rear of the pan, so that the waste heat from the products of combustion is given off at the rear of the apparatus away from the position at which the operator would stand when supervising the cooking operation or when emptying the pan, the apparatus provides more comfortable working conditions for the operator.

Heat pipes such as are utilized in the present invention operate isothermally over the entire length of the condenser section, and therefore the appliance operates efficiently with even small loads. That is, when a cold product to be cooked, i.e. a hamburger, is placed over one end or section of the heat pipes on the pan, the decrease in temperature in that section of the heat pipe is detected and additional heat from the remaining portions of the condenser section of the heat pipe is supplied to the section on which the cold product is being cooked, in order to maintain an isothermal condition in the heat pipe. It may be said that under such conditions the remaining portions of the heat pipe is actually acting as an evaporator section. As a result, more heat is supplied at a faster rate to the product being cooked than with conventional pans where the heat is supplied by the products of combustion and conduction through a thick pan.

This feature of heat pipes can be used advantageously in the present invention, as illustrated in FIGS. 2 and 3. As seen therein, one or more transverse heat pipes 75 can be mechanically and thermally bonded by brazing or the like, to the heat pipes 56. The heat pipes 75 do not have finned evaporator sections but merely are cylindrical "condenser" sections and are of known construction. By this arrangement, if a cold product, i.e. a hamburger, were placed on pan 12 over the first two heat pipes 56a and 56b, then, not only will those pipes act isothermally as discussed above, but also transverse pipes 75 will conduct heat from the remaining heat pipes 56c . . . 56i to heat pipes 56a and 56b and thus to the section of the latter under the hamburger, in order to maintain isothermal conditions. Accordingly, heat is efficiently and rapidly supplied to the required location. This advantageous characteristic of the present invention is enhanced by the fact that a relatively thin pan bottom can be utilized in constructing the pan so that good and rapid heat transfer between the pan and the heat pipes is accomplished. Moreover, a thermostatic control for the burners which is utilized to maintain a uniform temperature on the cooking surface, can be bonded to a transverse heat pipe 75 so that it can sense a decrease in temperature caused by food preparation in any portion of the brazing surface. As a result, the response of the burners to a decrease in pan temperature is more rapid than with conventional arrangements when the control is secured to the pan itself whereby conduction across the pan must occur before the control is activated.

In addition, the present invention conveniently lends itself to zoned heating of the cooking surface, as also shown in FIG. 3. As seen therein the heat pipes 56 may be arranged in separate groups 56a–i and 56a'–56i' with their respective evaporators associated with a separate and independently operated burner. As a result, one or both of the groups of heat pipes can be independently operated or simultaneously operated at different temperatures so that different cooking processes can take place on different sections of the pan. Of course, each group of heat pipes will have its own thermostatic control and more than two independent groups can be used each having its own independently controlled burner.

Accordingly, it is seen that a relatively simple and inexpensively constructed tilting brazier and commercial food cooking appliance is provided in which heat is uniformly supplied to the base of the cooking pan to avoid the creation of hot spots which would tend to overcook or burn the food therein and which is readily adaptable to zoned cooking or heating. Moreover, the construction of the apparatus, with the pivot point located at the front of the pan, provides improved emptying flow patterns for the food products therein and requires the pan to be tilted only 45° to completely empty the pan with relatively little movement of the top of the spout. The location of the spout at one corner of the pan and the location of the burner and waste heat exhaust at the rear of the pan provide more comfortable operating conditions for the operator utilizing the appliance.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A tilting brazier comprising a pan having a generally flat bottom wall and a plurality of side walls extending upwardly therefrom, one of said side walls defining a front wall and another of said side walls which is opposite said front wall defining a rear wall, a pan supporting stand, means pivotally mounting said pan on said stand adjacent the juncture between said front wall and said bottom wall; said bottom wall having an upper cooking surface and an opposed lower surface, and a plurality of heat pipes secured to said lower surface in heat transfer relation therewith, said heat pipes having evaporator and condenser portions with substantially the entire condenser portion of each of said pipes being located beneath said pan and the evaporator portions thereof extending beyond said rear wall, and means mounted in said stand for supplying heat to said evaporator portions of said heat pipes' whereby heat is uniformly transmitted to said pan from said evaporator portions of the heat pipes through the condenser portions thereof.

2. Apparatus as defined in claim 1 wherein said means for supplying heat includes a gas burner mounted in said stand immediately below said evaporator portions of said heat pipes.

3. Apparatus as described in claim 2 including a combustion product flue construction mounted on said pan adjacent said rear wall so as to move with said pan from and to an operative position as the pan is tilted upon said pivot means to pour products from the pan, said flue construction covering said evaporator portion of said heat pipes when in said operative position and having a combustion product flue extending from said evaporator portions to a discharge opening remote therefrom whereby products of combustion flow from said burners in heat exchange relationship with said evaporator portions and are then discharged through said flue to said discharge opening.

4. Apparatus as defined in claim 3 wherein said means for pivotally mounting said pan includes a curved surface formed in said stand and extending along the point of juncture between the front wall and bottom of said pan, said pan including means defining a curved surface complementary to and receiving the first mentioned curved surface and permitting relative movement therebetween.

5. Apparatus as defined in claim 4 including means operatively engaged with said pan rearwardly of said front wall for selectively tilting said pan about said first mentioned curved surface.

6. Apparatus as defined in claim 3 wherein said front wall extends angularly outwardly from said pan.

7. Apparatus as defined in claim 6 wherein said front wall includes a spout portion extending outwardly from said pan bottom at a greater angle than the remainder of said front wall.

8. Apparatus as defined in claim 7 wherein said spout portion is located adjacent one end of said front wall.

9. Apparatus as defined in claim 8 wherein said spout portion is relatively flat and extends outwardly and upwardly from said base at said base at a substantially 45° angle.

10. Apparatus as defined in claim 1 including at least one heat pipe thermally and mechanically bonded to the first mentioned heat pipes and extending transversely thereof to maintain isothermal conditions therein.

11. Apparatus as defined in claim 1 wherein said heat pipes are separated into at least two separate associated groups and said heat supplying means comprises and independently controlled gas burner associated with each of said groups.

12. A cooking apparatus including a cooking pan having upper and lower surfaces, a plurality of heat pipes secured to the lower surface of said pan in heat transfer relation therewith, said heat pipes having evaporator and condenser portions with substantially the the entire condenser portion of each of said pipes being located beneath said pan and means for supplying heat to said evaporator portions of said heat pipes whereby heat is transmitted at a controlled rate throughout said upper surface of said pan from said evaporator portion of said heat pipes through the condenser portions thereof.

13. Apparatus as defined in claim 12 wherein said evaporator portions of said heat pipes extend beyond the periphery of the pan, said means for supplying heat includes a gas burner located adjacent said evaporator portions of said heat pipes and a gas discharge duct surrounds said evaporator portions and said gas burner to direct products of combustion ffrom said gas burner about said evaporator portion of the heat pipes.

14. Apparatus as defined in claim 12 wherein said pan has a plurality of side walls extend ing upwardly therefrom, one of said side walls having a pouring spout formed therein and said evaporator portions of the heat pipes extending beyond the side wall of said pan opposite said spout.

15. Apparatus as defined in claim 14 including a stand for supporting said pan and means for pivotally mounting said pan along said one of said side walls whereby said pan is adapted to be tilted for pouring the contents thereof through said spout.

16. Apparatus as defined in claim 15 including means operatively engaged with said pan rearwardly of said pivotally mounting means for selectively tilting said pan.

17. Apparatus as defined in claim 12 including at least one heat pipe thermally and mechanically bonded to the first mentioned heat pipes and extending transversely thereof to maintain isothermal conditions therein.

18. Apparatus as defined in claim 12 wherein said heat pipes are separated into at least two separate associated groups and said heat supplying means comprises and independently controlled gas burner associated with each of said groups.

19. In a tilting brazier, the combination of a pan having a generally flat bottom wall and peripheral side walls extending upwardly therefrom, a pouring spout formed in one end of said side walls through which products in said pan may be poured by tilting the pan, said spout extending angularly outwardly from said bottom wall, a support for said pan, and means pivotally mounting said pan on said support along a pivot axis located below said pan bottom adjacent the point of juncture of said spout and pan bottom.

20. In a tilting brazier as defined in claim 20 wherein said spout extends outwardly from said pan bottom at an angle of approximately 135°.

21. In a tilting brazier as defined in claim 20 wherein said spout includes a relatively flat wall portion and a curved wall portion tangentially interconnecting said flat wall with said pan bottom.

* * * * *

UNITED STATES PATENT OFFICE
CERTIFICATE OF CORRECTION

Patent No. 3,744,475     Dated  July 10, 1973

Inventor(s) George W. Myler, et al.

It is certified that error appears in the above-identified patent and that said Letters Patent are hereby corrected as shown below:

In the heading, the address of the inventor Robert G. Venendaal should be changed to--Upper Arlington--.

Column 8, lines 36-37 (Claim 1), "portions thereof" should be changed to--portion of each of said pipes--.

Column 8, line 52 (Claim 3), "said" should be changed to--the--.

Column 8, line 53 (Claim 3), "said" (first occurrence) should be changed to--each of the--.

Column 9, line 24 (Claim 11), "and" (second occurrence) should be changed to--an--.

Column 9, line 36 (Claim 12), "portion" should be changed to--portions--.

Column 9, line 45 (Claim 13), "ffrom" should be changed to--from--.

Column 10, line 1 (Claim 13), "portion" should be changed to--portions--.

Column 10, line 25 (Claim 18), "and" should be changed to--an--.

Column 10, line 27 (Claim 19), "combination of a pan" should be changed to--combination of, a pan--.

Signed and sealed this 8th day of January 1974.

(SEAL)
Attest:

EDWARD M. FLETCHER, JR.
Attesting Officer

RENE D. TEGTMEYER
Acting Commissioner of Patents